(12) United States Patent
Johnson et al.

(10) Patent No.: US 7,751,401 B2
(45) Date of Patent: Jul. 6, 2010

(54) METHOD AND APPARATUS TO PROVIDE VIRTUAL TOE INTERFACE WITH FAIL-OVER

(75) Inventors: Darrin P. Johnson, Mountain View, CA (US); Kais Belgaied, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 94 days.

(21) Appl. No.: 12/164,378

(22) Filed: Jun. 30, 2008

(65) Prior Publication Data

US 2009/0323691 A1    Dec. 31, 2009

(51) Int. Cl.
*H04L 12/28* (2006.01)

(52) U.S. Cl. .......................... 370/392; 370/351; 370/389

(58) Field of Classification Search ................. 370/351, 370/389, 392
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,996,070 B2 * | 2/2006 | Starr et al. ................... | 370/252 |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,487,284 B2 * | 2/2009 | Kapur et al. ................. | 710/310 |
| 2002/0052972 A1 | 5/2002 | Yim | |
| 2003/0037154 A1 | 2/2003 | Poggio et al. | |
| 2004/0062245 A1* | 4/2004 | Sharp et al. ................. | 370/392 |
| 2004/0267866 A1 | 12/2004 | Carollo et al. | |
| 2005/0111455 A1 | 5/2005 | Nozue et al. | |

(Continued)

OTHER PUBLICATIONS

Droux, N.; "Crossbow Virtualization Architecture"; Aug. 28, 2007; Solaris Core OS, Sun Microsystems, Inc.; 51 pages.

(Continued)

*Primary Examiner*—Chi H Pham
*Assistant Examiner*—Robert Lopata
(74) *Attorney, Agent, or Firm*—Osha • Liang LLP

(57) ABSTRACT

A method for processing packets. The method includes receiving a first packet by a first socket on a host, determining by the first socket to process the first packet using a first virtual Transmission Control Protocol offload engine (VTOE), transmitting the first packet to the first VTOE, wherein transmitting the first packet to the first VTOE bypasses a first virtual network stack interposed between the first socket and first VTOE, transmitting the first packet to a HW TOE operatively connected to the host, processing the first packet, using the HW TOE, to obtain a first processed packet; and transmitting the first processed packet to a network operatively connected to the HW TOE, where the HW TOE is associated with the first VTOE and a second VTOE in the host.

20 Claims, 5 Drawing Sheets

U.S. PATENT DOCUMENTS

| | | | |
|---|---|---|---|
| 2005/0135243 | A1 | 6/2005 | Lee et al. |
| 2005/0138620 | A1 | 6/2005 | Lewites |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0168281 | A1* | 7/2006 | Starr et al. .................. 709/230 |
| 2006/0174324 | A1 | 8/2006 | Zur et al. |
| 2007/0297334 | A1* | 12/2007 | Pong ........................ 370/235 |
| 2008/0117911 | A1* | 5/2008 | Rajakarunanayake et al. .... 370/392 |
| 2008/0285435 | A1* | 11/2008 | Abdulla et al. .............. 370/217 |

OTHER PUBLICATIONS

Tripathi, S.; "Data Path: Soft Ring Set (SRS) and Soft Rings for Dynamic Polling & Parallelization"; Jul. 23, 2007; 7 pages.

Tripathi, S.; "Crossbow Architectural Document"; Nov. 21, 2006; 19 pages.

Droux, N.; "Crossbow: Network Virtualization and Bandwidth Partitioning"; presented at CHOSUG, Jun. 19, 2007; 23 pages.

Nordmark; E.; "IP Instances—Network Virtualization Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

Dovrolis, C., Thayer, B. and Ramanathan, P.: "HIP: Hybrid Interrupt—Polling for the the Network Interface", ACM SIGOPS Operating Systems Review, vol. 35, Iss. 4, Oct. 2001, (11 Pages).

\* cited by examiner ural network stack (VNS) interposed between the first socket and first VTOE, wherein the first VTOE is configured to transmit the first packet to the HW TOE operatively connected to the host, wherein the HW TOE is configured to process the first packet in accordance with TCP and wherein the HW TOE is associated with the first VTOE and a second VTOE in the host, wherein the HW TOE is configured to process the first packet to obtain a first processed packet, and transmit the first processed packet to a network operatively connected to the HW TOE.

In general, the invention relates to a computer readable medium comprising a plurality of executable instructions for processing packets, wherein the plurality of executable instructions comprises instructions to receive a first packet by a first socket on a host, determine by the first socket to process the first packet using a first virtual Transmission Control Protocol (TCP) offload engine (VTOE), transmit the first packet to the first VTOE, wherein transmitting the first packet to the first VTOE bypasses a first virtual network stack (VNS) interposed between the first socket and first VTOE, transmit the first packet to a hardware TOE (HW TOE) operatively connected to the host, wherein the HW TOE is configured to process the first packet in accordance with TCP and wherein the HW TOE is associated with the first VTOE and a second VTOE in the host, process the first packet, using the HW TOE, to obtain a first processed packet, and transmit the first processed packet to a network operatively connected to the HW TOE.

Other aspects of the invention will be apparent from the following description and the appended claims.

DETAILED DESCRIPTION

Figure 1:
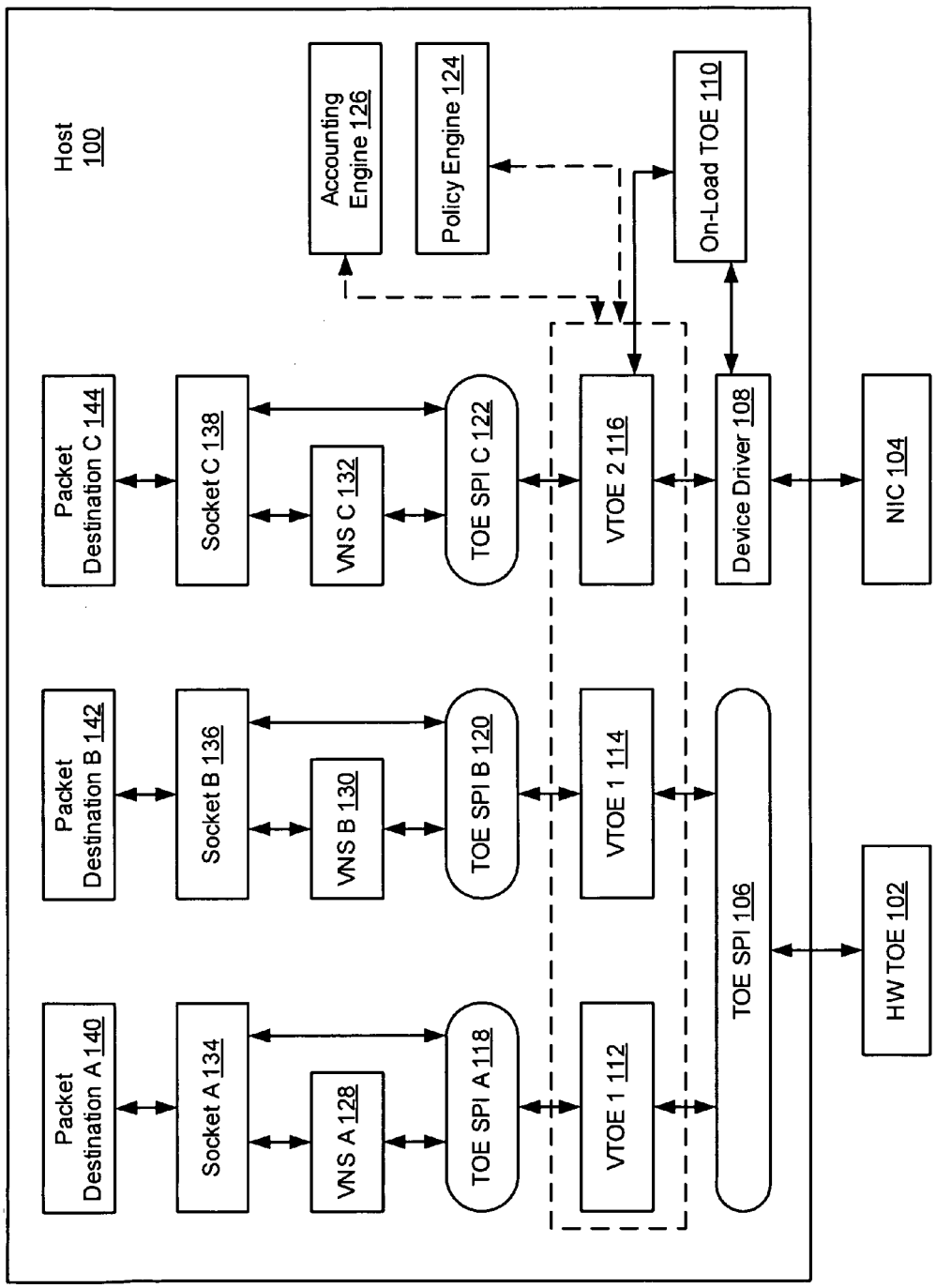
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for processing packets received from a network and packets sent to the network. More specifically, embodiments of the invention relate to a method and system for using virtual Transmission Control Protocol (TCP) offload engines (VTOEs) to process inbound and outbound packets, where the VTOEs are mapped to a hardware TOE (HW TOE) and/or an on-load TOE. Further, embodiments of the invention providing a policy for defining when to use the HW TOE and the on-load TOE process packets. The policies may take into account situations when the HW TOE is unavailable (e.g., the

METHOD AND APPARATUS TO PROVIDE VIRTUAL TOE INTERFACE WITH FAIL-OVER

BACKGROUND

Network traffic is transmitted over a network, such as the Internet, from a host (e.g., a device capable of receiving data over a network) to another host. Each host uses a specialized piece of hardware commonly referred to as a network interface card (NIC) to access the network. The NIC is a piece of hardware found in a typical computer system that includes functionality to send and receive network traffic. Typically, network traffic is transmitted in the form of packets, where each packet includes a header and a payload. The header includes information regarding the source address, destination address, size, transport protocol used to transmit the packet, and various other identification information associated with the packet of data. The payload includes the actual data to be transmitted from the network to the receiving system. The contents and transmission of the aforementioned packets on the network are typically governed by Transmission Control Protocol (TCP) and Internet Protocol (IP).

Processing network traffic requires significant host resources. To decrease the amount of processing required by the host, specialized hardware has been developed to process packets. The specialized hardware is external to the processor, which initially processes the packet, and typically only supports single threaded processing (i.e., packets are typically not processed in parallel). The specialized hardware typically includes functionality to obtain packets from the processor, perform specific functions on the packet (e.g., calculate checksum, decrypt packet, encrypt packet, and perform processing required by TCP or IP, etc.), and return the processed packets to the processor. In order to use the specialized hardware, two or more additional I/O operations are typically required in order to transfer packets to the specialized hardware and received the processed packets from the specialized hardware.

SUMMARY

In general, in one aspect, the invention relates to a method for processing packets. The method includes, receiving a first packet by a first socket on a host, determining by the first socket to process the first packet using a first virtual Transmission Control Protocol (TCP) offload engine (VTOE), transmitting the first packet to the first VTOE, wherein transmitting the first packet to the first VTOE bypasses a first virtual network stack (VNS) interposed between the first socket and first VTOE, transmitting the first packet to a hardware TOE (HW TOE) operatively connected to the host, wherein the HW TOE is configured to process the first packet in accordance with TCP and wherein the HW TOE is associated with the first VTOE and a second VTOE in the host, processing the first packet, using the HW TOE, to obtain a first processed packet, and transmitting the first processed packet to a network operatively connected to the HW TOE.

In general, in one aspect, the invention relates to a system. The system includes a host, a hardware Transmission Control Protocol (TCP) offload engine (HW TOE) operatively connected to the host, an On-Load TOE executing on the host, and a network interface card (NIC) operatively connected to the host, wherein a first socket executing on the host is configured to receive a first packet, determine to process the first packet using a first virtual TOE (VTOE), and transmit the first packet to the first VTOE, wherein transmitting the first packet HW TOE has failed, is currently busy processing other packets, etc.) and when the packets being processed are low priority (i.e., the packets may not need to be processed using the HW TOE).

FIG. 1 shows a system in accordance with one embodiment of the invention. As shown in FIG. 1, the system includes a host (100) operatively connected to a network interface card (NIC) (104). The NIC (102) provides an interface between the host (100) and a network (not shown) (e.g., a local area network, a wide area network, a wireless network, etc.). More specifically, the NIC (104) includes a network interface (NI) (i.e., the hardware on the NIC used to interface with the network) (not shown). For example, the NI may correspond to an RJ-45 connector, a wireless antenna, etc. The packets received by the NI are then sent to other components (not shown) on the NIC (104) for processing.

In one embodiment of the invention, the NIC (100) includes a hardware classifier and one or more hardware receive rings (HRRs). In one embodiment of the invention, the HRRs correspond to portions of memory within the NIC (104) used to temporarily store the received packets.

In one embodiment of the invention, the hardware classifier is configured to analyze the incoming network traffic, typically in the form of packets, received from the network (not shown). In one embodiment of the invention, analyzing individual packets includes determining to which of the HRRs each packet is sent. In one embodiment of the invention, analyzing the packets by the hardware classifier includes analyzing one or more fields in each of the packets to determine to which of the HRRs the packets are sent. As an alternative, the hardware classifier may use the contents of one or more fields in each packet as an index into a data structure that includes information necessary to determine to which HRR that packet is sent.

The hardware classifier may be implemented entirely in hardware (i.e., the hardware classifier may be a separate microprocessor embedded on the NIC (104)). Alternatively, the hardware classifier may be implemented in software stored in memory (e.g., firmware, etc.) on the NIC (104) and executed by a microprocessor on the NIC (104).

In one embodiment of the invention, the host (100) is also operatively connected to a HW TOE (102). The HW TOE (102) includes the same functionality as the NIC (104). Further, the HW TOE (102) includes functionality to process in-bound packets (i.e., packet received from the network (not shown), which are destined for the host (100)) and out-bound packets (i.e., packets received from the host (100), which are destined for the network (not shown)) in accordance with TCP. The TCP processing includes the processing typically performed by the virtual network stacks (VNSs) (128, 130, 132) (discussed below). Accordingly, instead of the VNSs (128, 130, 132) processing packets, the packets are processed by the HW TOE (102). The TCP processing may include, but is not limited to, processing related to (i) connection establishment between sockets (134, 136, 138); (ii) acknowledgment of packets received; (iii) checksum and sequence number calculations; (iv) sliding window calculations for packet acknowledgement and congestion control; (v) connection termination; and (vi) maintain a context for the TCP connection.

In one embodiment of the invention, the host (100) may include the following components: one or more TOE service provider interfaces (SPIs) (106, 118, 120, 122), a device driver (108), one or more VTOEs (112, 114, 116), (VNSs) (126, 130, 132), one or more sockets (134, 136, 138), one or more packet destinations (140, 142, 144), one or more on-load TOEs (110), a policy engine, 124), and an accounting engine (126). Each of the aforementioned components is described below.

In one embodiment of the invention, the device driver (108) provides an interface between the HRRs and the host (100). More specifically, the device driver (108) exposes the HRRs to the host (100) such that the host (100) (or, more specifically, a process executing on the host) may obtain packets from the HRRs.

Though not shown in FIG. 1, in one embodiment of the invention, the host may include a software ring. Further, the software ring may include a software classifier and a number of software receive rings (SRR). In one embodiment of the invention, the software classifier has the same functionality as the hardware classifier. However, instead of sending the classified packets to a HRR, the software classifier forwards classified packets to one of the SRRs. The SRRs are configured to temporarily store the received packets after being classified by the software classifier. In one embodiment of the invention, the software ring resides in a Media Access Control (MAC) layer of the host (100). U.S. Patent Application entitled "Host Operating System Bypass for Packets Destined for a Virtual Machine" with U.S. application Ser. No. 11/489, 943 describes a software ring. U.S. application Ser. No. 11/489,943 is incorporated by reference in its entirety. In one embodiment of the invention, the TOE SPI (106) the provides an interface between the HW TOE (102) and the host (100).

In one embodiment of the invention, each of the VTOEs (112, 114, 116) is associated with either a SRR or a HRR (in the HW TOE (102) or NIC (104)). The VTOEs (112, 114, 116) provide an abstraction layer between the HW TOE (102) or NIC (104) and the various packet destinations (140, 142, 144) executing on the host (100). More specifically, each VTOE (112, 114, 116) operates like a HW TOE (102). For example, in one embodiment of the invention, each VTOE (112, 114, 116) is associated with one or more Internet Protocol (IP) addresses, one or more Media Access Control (MAC) addresses, optionally, one or more ports, and, is optionally configured to handle one or more protocol types.

Thus, while the host (100) may be operatively connected to a finite number of HW TOEs (102) and NICs (104), packet destinations (140, 142, 144) executing on the host (100) operate as if the host (100) is bound to HW TOEs. Accordingly, while the VTOEs (112, 114, 116) do not, themselves, include functionality to processes packets in accordance with TCP, to components above them in the host (e.g, VNSs (128, 130, 132), sockets (134, 136, 138), packet destinations (140, 142, 144)), the VTOEs (112, 114, 116) appears as HW TOEs. In one embodiment of the invention, the VTOEs (112, 114, 116) reside in a Media Access Control (MAC) layer of the host (100).

Each of the VTOEs (112, 114, 116) may be operatively connected to a corresponding VNS (128, 130, 132). In one embodiment of the invention, each VNS (128, 130, 132) includes functionality to process packets in accordance with various protocols used to send and receive packets (e.g., Transmission Communication Protocol (TCP), Internet Protocol (IP), User Datagram Protocol (UDP), etc.). Further, each VNS (128, 130, 132) may also include functionality, as needed, to perform additional processing on the incoming and outgoing packets. This additional processing may include, but is not limited to, cryptographic processing, firewall routing, etc.

In one embodiment of the invention, each VNS (128, 130, 132) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the VNSs (124) is discussed in FIG. 2.

As discussed above, the host (100) includes one or more packet destinations (140, 142, 144). In one embodiment of the invention, the packet destination(s) (140, 142, 144) corresponds to any process (or group of processes) executing on the host that is configured to send and/or receive network traffic. Further, the packet destination(s) (140, 142, 144) does not include an internal network stack (i.e., there is no network stack within the packet destination); rather, the packet destination (140, 142, 144) is associated with a VNS (128, 130, 132).

Examples of packet destinations (140, 142, 144) include, but are not limited to containers and services (e.g., web server) executing on the host (100). As shown in FIG. 1, the VNS (134, 136, 138) is associated with a packet destination (140, 142, 144). In one embodiment of the invention, each packet destination is associated with a single VNS (134, 136, 138). Alternatively, each packet destination is associated with one or more VNSs (134, 136, 138).

In one embodiment of the invention, each VNS (134, 136, 138) is associated with a bandwidth allocation. Those skilled in the art will appreciate that if there is only one VNS (134, 136, 138) bound to the packet destination (140, 142, 144), then the bandwidth allocation of the VNS (134, 136, 138) corresponds to the bandwidth allocated to the packet destination (140, 142, 144).

In one embodiment of the invention, the bandwidth allocation corresponds to the number of packets the packet destination may receive in a given time interval (e.g., megabytes per seconds). The bandwidth allocation for a given packet destination is enforced by the VNS operating in polling mode. Embodiments for implementing bandwidth allocated are described in co-pending commonly owned U.S. Patent Applications entitled "Method and Apparatus for Managing and Accounting for Bandwidth Utilization Within A Computing System" with U.S. application Ser. No. 11/112,367 and "Method and System for Controlling Virtual Machine Bandwidth" with U.S. application Ser. No. 11/480,000. The contents of both the aforementioned applications are incorporated by reference in their entirety.

Continuing with the discussion of FIG. 1, though not shown in FIG. 1, in one embodiment of the invention, the VTOEs (112, 114, 116) may be bound to a virtual machine (e.g., Xen® Domain) instead of a packet destination (140, 142, 144). In such cases, the VTOE is bound to an interface (e.g., a Xen® interface), where the interface enables the VTOE to communicate to with the virtual machine. (Xen® is a trademark overseen by the Xen Project Advisory Board.) In one embodiment of the invention, each of the aforementioned virtual machines includes its own network stack (e.g., 128, 130, 132) and includes its own operating system (OS) instance, which may be different than the OS executing on the host. In one embodiment of the invention, each virtual machine is associated with its own MAC address and IP address (which may be static or obtained using Dynamic Host Configuration Protocol (DHCP)). Further, the VTOE associated with the virtual machine is associated with the virtual machine includes the same MAC address and IP address as virtual machine with which it is associated.

Continuing with the discussion of FIG. 1, in one embodiment of the invention, the on-load TOE (110) corresponds software configured to perform the same functions as the HW TOE (102). The on-load TOE (110) may be configured to use process packets using the same configuration parameters as the HW TOE (102). Alternatively, the on-load TOE (110) may process packets using different configuration parameters. In one embodiment of the invention, each VTOE (112, 114, 116) may be associated with the HW TOE (102) and/or the on-load TOE (110). In one embodiment of the invention, the on-load TOE (110) is implemented using partitioned general purpose hardware in the host and executes a software implementation of the HW TOE.

In one embodiment of the invention, the policy engine (124) is configured to store one or more policies. Further, the policy engine (124) is configured to enforce the policies stored within the policy engine (124). In another embodiment of the invention, the policies are stored in a location accessible by the policy engine (as opposed to within the policy engine).

In one embodiment of the invention, each policy specifies how to process packets received by one or more VTOEs. More specifically, the policy specifies whether a given packet received by a VTOE should be processed using the HW TOE (102), the on-load TOE (110), or if the process should not be process by the neither. For example, the policy may specify that processing packets pursuant to TCP should be performed using the HW TOE hardware if the HW TOE is available and should be performed using the on-load TOE when the HW TOE hardware is not available (e.g., because the HW TOE is currently in use or the HW TOE hardware has failed). In one embodiment of the invention, the policy engine (124) may include a global policy that is used by all VTOEs. Alternatively, each VTOE (or a subset of VTOEs) may be associated with a policy.

In one embodiment of the invention, the sockets (134, 136, 138) are communication end-points when communicating using TCP. The sockets (134, 136, 138) are created on-demand (i.e., when the packet destinations (140, 142, 144) want to communicate using TCP) and are terminated once the communication is completed. If the connection, in which the socket (134, 136, 138) is an end-point, is using TOE processing (provided by the HW TOE or on-load TOE), the socket (134, 136, 138) may send packets directly (i.e., by passing VNS (128, 130, 132)) the to the associated VTOE via a TOE SPI (118, 120, 122) interposed between the VNS (128, 130, 132) and the VTOE (112, 114, 116). The TOE SPI (118, 120, 122) interposed between the VNS (128, 130, 132) and the VTOE (112, 114, 116) include the same functionality as the TOE SPI (106) interfacing with the HW TOE (102). More specifically, all TOE SPIs (106, 118, 120, 122) advertise the capabilities of the HW offload engine in the same manner. Further, the virtualization layer (i.e., the layer in which the VTOEs are implemented) (not shown) is the layer which is aware that the TOE SPIs (118, 120, 122) are not interfacing with an actual HW TOE. Further, the virtualization layer includes functionality to send packets to the HW TOE or the on-load TOE as appropriate.

Alternatively, if the connection is not using TOE processing, the packets are sent the VNS for processing. The processed packets are then sent to the VTOE and subsequently to the HW TOE (106). As the packets are already processed when they reach the HW TOE (106), the HW TOE (106) only needs to transmit the processed packets to the network.

In one embodiment, if the connection is using TOE processing, then in-bound packets received by the HW TOE (102) for the connection are processed by the HW TOE (102)

and then transmitted (via the TOE SPI (106)) to the VTOE (112). The VTOE (112) then transmits (via the TOE SPI (118)) to the socket (bypassing the VNS). In one embodiment of the invention, if the packet is received by the NIC (104) and the connection over which the packet is communicated is using TOE processing, then the packet is transmitted to VTOE (116) (via driver (108)), the VTOE (116) then transmits the packet to the on-load TOE (110) for TCP processing. Upon completion, the processed packets are transmitted back to the VTOE (116). The VTOE (116), the transmits the processed packets directly to the socket (138) using the TOE SPI (112) (thereby bypassing the VNS (132)).

In one embodiment of the invention, the host (100) includes an accounting engine (126) configured to track the number of packets processed by the HW TOE (102), by each VTOE (112), by the on-load TOE (110), or any combination thereof. The aforementioned information may then be used, for example, to bill customers for their usage of the HW TOE, etc.

Figure 2:
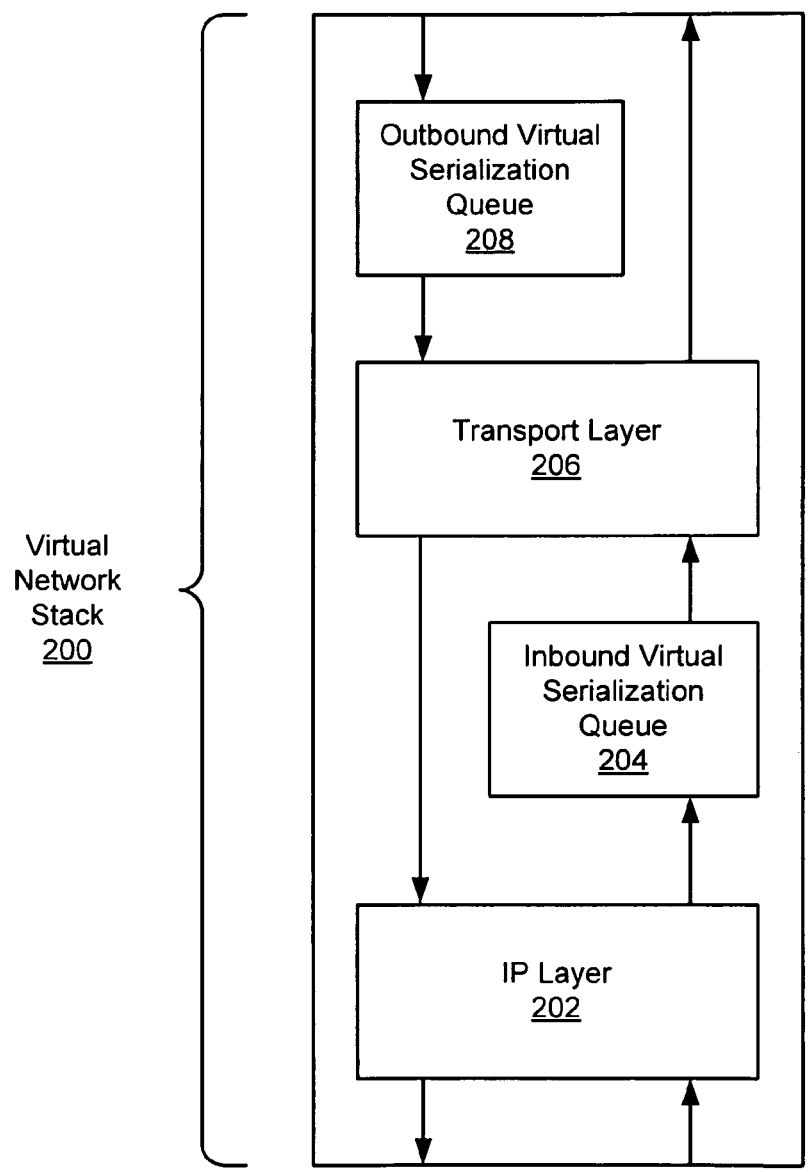
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (VSQ) (204), a transport layer (206), and an outbound serialization queue (208). Each of the aforementioned components is discussed below.

In one embodiment, the IP layer (202) is configured to receive packets from the VTOE associated with the VNS (e.g., VNS A (128) receives packets from VTOE A (112) in FIG. 1). Further, the IP layer (202) is configured to receive packets from the transport layer (206). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being processed by the transport layer (206). In one embodiment of the invention, the inbound VSQ (204) may be used to control the number of packets being received by the packet destination (e.g., 132) associated with VNS. The inbound VSQ (204) may control the bandwidth by limiting the number of packets in the VSQ (204) and preventing additional packets from entering the VNS (200) until the inbound VSQ (204) has less than a threshold number of packets. In one embodiment of the invention, the VSQ (204) prevents the admission of extra packet by, for example, tail dropping (i.e., systematically dropping all packets beyond a certain high water mark) or by random early dropping (RED) (a mechanism to inform sending entities to reduce the number of packets sent to prevent congestion).

In one embodiment of the invention, the transport layer (206) is configured to process inbound and outbound packets in accordance with Transmission Control Protocol (TCP), User Datagram Protocol (UDP), or both UDP and TCP. Other protocols may be supported by the transport layer (206).

In one embodiment of the invention, the outbound VSQ (208) is a queue data structure configured to receive packets from the packet destination (e.g., 132) with which the VNS (204) is associated. Further, the outbound VSQ (208) is configured to store packets prior to sending the received packets to the transport layer (206). In one embodiment of the invention, the outbound VSQ (208) is also configured to control the flow of packets from the packet destination (e.g., 140) associated with the VNS (204) to the VNS (200). In one embodiment of the invention, the outbound VSQ (208) (or a related process) is configured to block an application for sending packets to the outbound VSQ (208), if the packet destination (e.g., 140) is attempting to issue packets at a higher rate than the outbound bandwidth allocated to the packet destination (e.g., 132). Further, the outbound VSQ (208) (or a related process) is configured to notify the packet destination (e.g., 140) when it is no longer blocked from issuing packets to the VNS (200).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the resource requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (206) only supports UDP, then the inbound VSQ (204) and outbound VSQ (208) may be configured to allow concurrent access. Said another way, two or more threads may concurrently access the VSQ (inbound or outbound). In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

In one embodiment of the invention, the inbound VSQ (204) and the outbound VSQ (208) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

Figure 3:
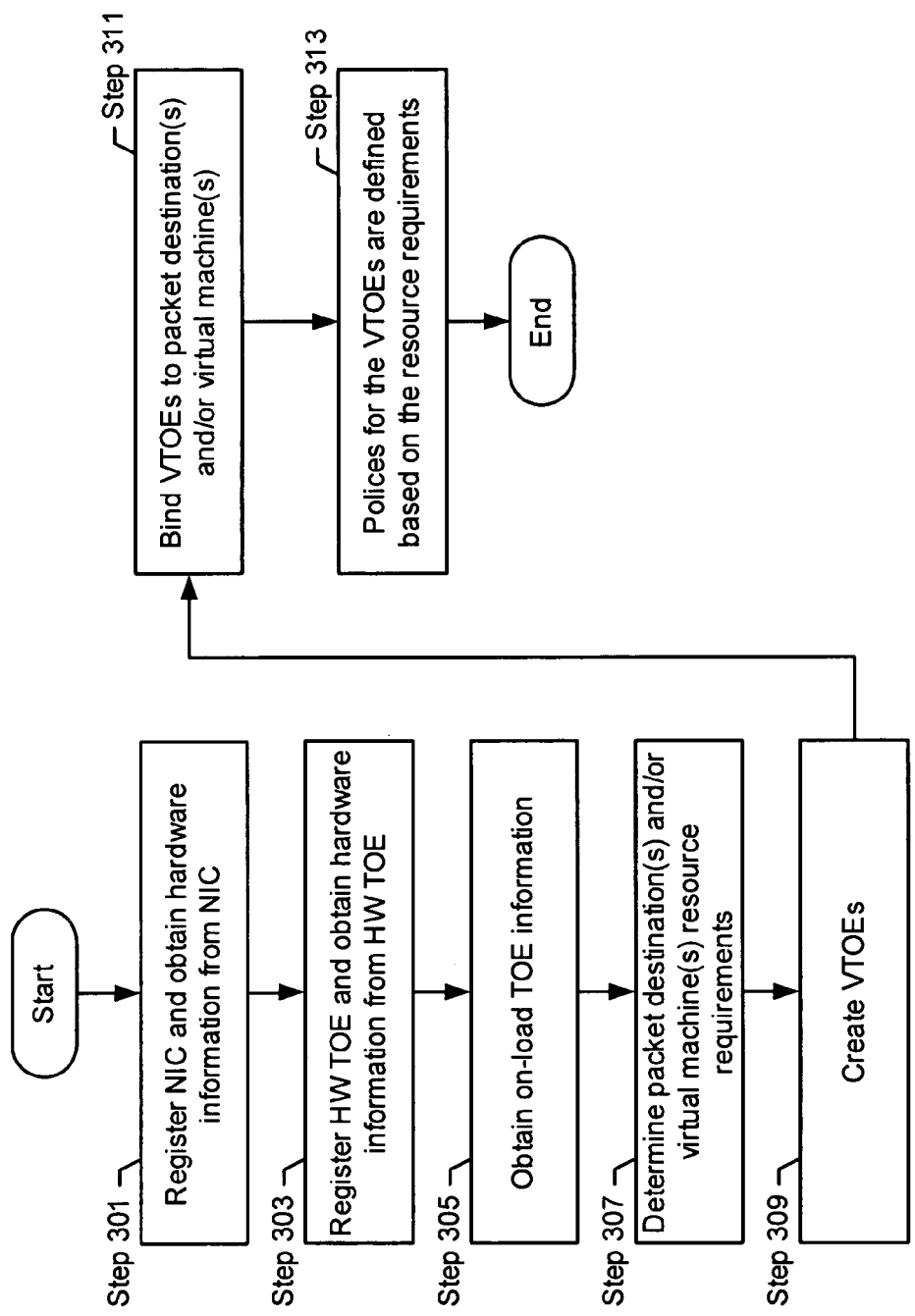
FIGS. 3-4 show flow charts in accordance with one embodiment of the invention.
Figure 4:
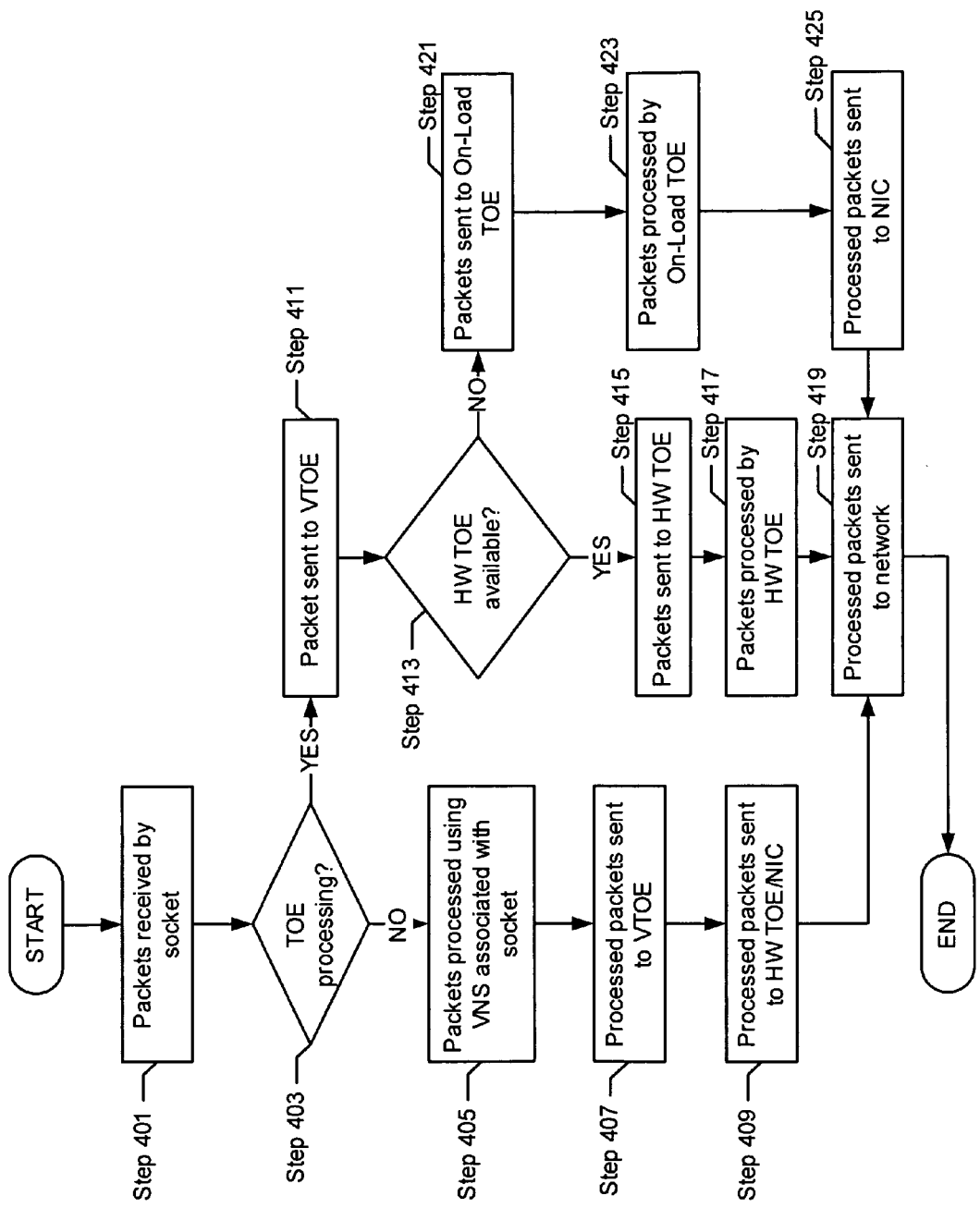

FIGS. 3-4 show flowcharts of methods in accordance with one or more embodiments of the invention. While the various steps in the flowcharts are presented and described sequentially, one of ordinary skill will appreciate that some or all of the steps may be executed in different orders and some or all of the steps may be executed in parallel.

FIG. 3 shows a flow chart in accordance with one or more embodiments of the invention. More specifically, FIG. 3 shows a method for setting up VTOEs in accordance with one embodiment of the invention. In Step 301, the NIC is registered and the appropriate device driver is used to obtain hardware information about the network interface card (NIC). In Step 303, the HW TOE is registered and the appropriate interface (TOE SPI) is used to obtain information about HW TOE. Step 303 may also include determine the specific functionality/processing capabilities of the HW TOE.

In Step 305, on-load TOE information is obtained. In one embodiment of the invention, the on-load TOE information may include, but is not limited to, what specific TCP processing the on-load TOE provides, the host resources available to the on-load TOE (e.g., processors, memory, etc.), etc.

In Step 307, packet destination and/or VM resource requirements are obtained. In one embodiment of the invention, the resource requirements may include, but are not limited to, whether packets for a given packet destination or VM should be processed using HW TOE, on-load TOE, or no-TOE processing.

In Step 309, VTOEs are created on the host. In Step 413 the VTOEs bound the packet destinations and/or VMs. Specifically, the VTOEs are associated with the RRs (HRR or SRR) and the hardware classifier (in the NIC and HW TOE) and the software classifier (if host includes a software ring) are programmed. In one embodiment of the invention, programming the hardware classifier and software classifier includes specifying to which HRR or SRR to send the received packets.

In one embodiment of the invention, programming the hardware classifier includes specifying that all packets for a specific packet destination or virtual machine are sent to a specific HRR. In one embodiment of the invention, the hardware classifier is programmed using the MAC address and, optionally, the IP address associated with the virtual machines. Thus, all packets with a specific MAC address (and optionally an IP address) are sent to a specific HRR. As discussed, the HRRs are bound to VNICs or software rings. Thus, packets sent to specific HRRs are subsequently sent to the appropriate VNIC or software ring.

In the case where the packets are sent to the software ring, the software classifier in the software ring performs additional classification. In one embodiment of the invention, the software classifier includes the same functionality as the hardware classifier and is programmed using the same criteria (e.g., MAC addresses, IP addresses, etc.) as the hardware classifier.

In one embodiment of the invention, VNICs are preferably bound to an HRR if an HRR is available and the hardware classifier in the NIC is configured to perform the level of classification required by the host. In such cases, one HRR is bound to a software ring and the other HRRs are bound to VNICs. In one embodiment of the invention, each of the aforementioned VNICs is associated with a virtual network stack (VNS). Further, each VNS is associated with a bandwidth allocation.

As stated above, software rings can be arbitrarily created on top of HRR or SRRs. As a result, different structures involving software rings can be created to handle the same number of VNICs using the method shown in FIG. 3.

Continuing with the discussion of FIG. 3, in Step 313 the policy (or policies) for the VTOEs are obtained. As discussed above, the policies specify how the VTOEs process packets using the HW TOE and/or on-load TOE.

FIG. 4 shows a flow chart in accordance with one or more embodiments of the invention. More specifically, FIG. 4 describes a method for using a host configured using the methods described in FIG. 3 to send packets to a network in accordance with one embodiment of the invention.

In Step 401, packets are received by the socket. In Step 403, a determination is made about whether the packets are to be processed using TOE. This determination may be based on the information associated with the connection. If the packets are to be processed using TOE, the process proceeds to ST 411. If the packets are not to be processed using TOE, the process proceeds to ST 405

In Step 405, packets are processed using the VNS associated with the socket to obtain processed packets. In Step 407, the processed packets are transmitted to the appropriate VTOE. In Step 409, the processed packets are then transmitted to the HW TOE or NIC (depending to which the VTOE is bound). The process then proceeds to Step 419. In Step 419, the processed packets are transmitted to the network towards their destination.

In Step 411, if the packets are to be processed using TOE, the packets are sent to the VTOE (bypassing the associated VNS). In Step 413, a determination is made about whether the HW TOE is available. If the HW TOE is available, the process proceeds to Step 415. Alternatively, the process proceeds to Step 421. In Step 415, the packets are sent to the HW TOE for processing. In Step 417, packets are processed by the HW TOE. The packets then proceed to the Step 419.

In Step 421, if the HW TOE is not available, the packets are sent to the on-load TOE for processing. In Step 423, the packets are processed by the on-load TOE. In one embodiment of the invention, the packets are sent from the VTOE associated with the socket (i.e., the socket in Step 401) directly to the on-load TOE. Alternatively, the packets are sent from the VTOE associated with the socket (i.e., the socket in Step 401) to the VTOE associated with the on-load resources. Further, the VTOE associated with the socket (i.e., the socket in Step 401) may also provide the configuration parameters of the HW TOE and request that the on-load process the packets using the configuration parameters of the HW TOE to process the packets. Once the packets have been processed, the packets may either be returned to the VTOE associated with the socket (i.e., the socket in Step 401), the VTOE associated with the on-load TOE, or alternatively the processed packets may remain with the on-load TOE and the process proceeds to Step 425.

In Step 425, the processed packets are then transmitted to NIC. The process then proceeds to Step 419. In one embodiment, if the packets remain with the on-load TOE, the packets are transmitted from the on-load TOE to the device driver associated with NIC and then subsequently to the NIC.

Figure 5:
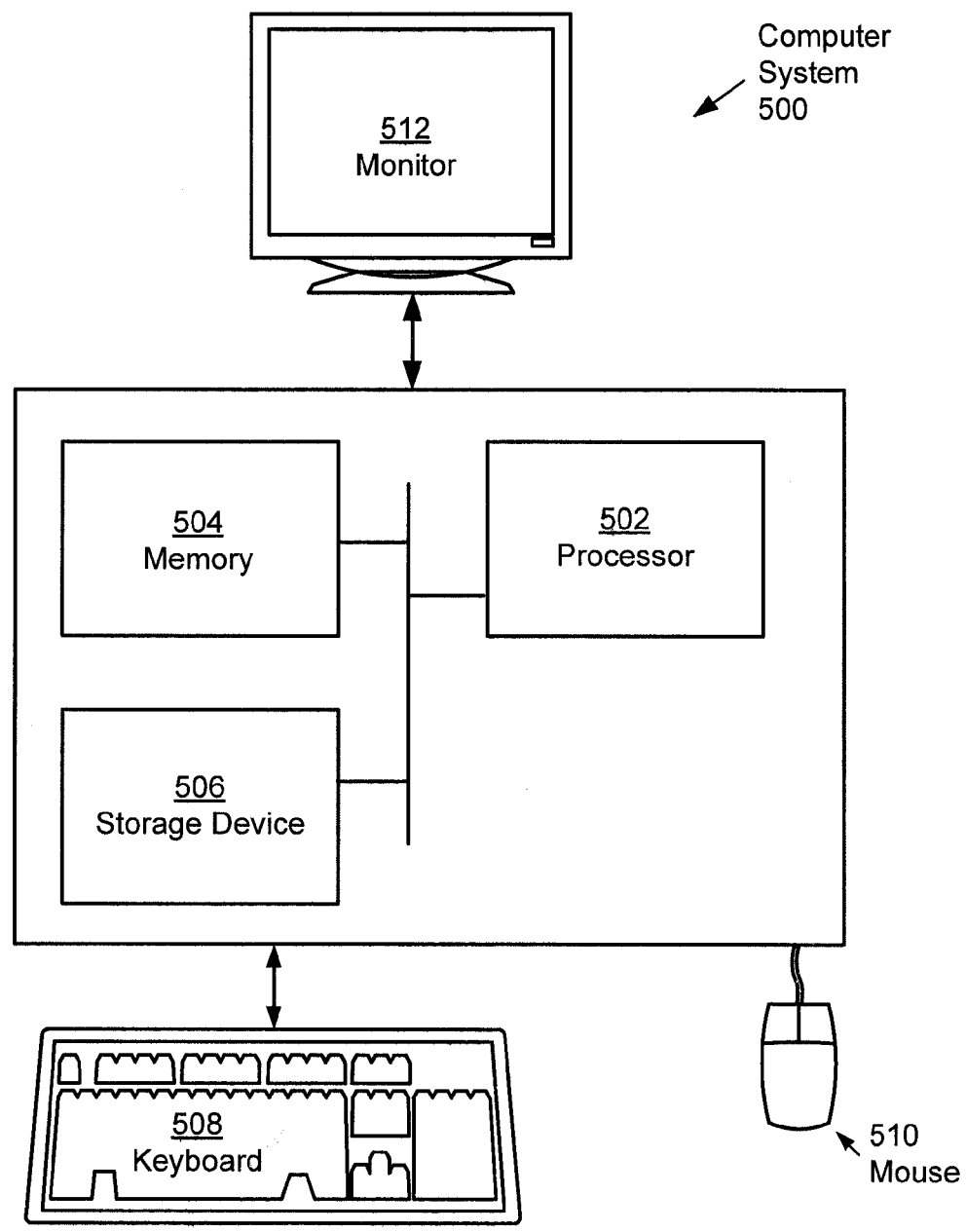
FIG. 5 shows a computer in accordance with one embodiment of the invention.

An embodiment of the invention may be implemented on virtually any type of computer regardless of the platform being used. For example, as shown in FIG. 5, a networked computer system (500) includes a processor (502), associated memory (i.e., Random Access Memory, Read-only Memory, etc.) (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
   receiving a first packet by a first socket on a host;
   determining, by the first socket, to process the first packet using a first virtual Transmission Control Protocol (TCP) offload engine (VTOE);

transmitting the first packet to the first VTOE, wherein transmitting the first packet to the first VTOE bypasses a first virtual network stack (VNS) interposed between the first socket and first VTOE;

transmitting the first packet to a hardware TOE (HW TOE) operatively connected to the host, wherein the HW TOE is configured to process the first packet in accordance with TCP and wherein the HW TOE is associated with the first VTOE and a second VTOE in the host;

processing the first packet, using the HW TOE, to obtain a first processed packet; and transmitting the first processed packet to a network operatively connected to the HW TOE.

2. The method of claim 1, further comprising:
receiving a second packet by a second socket on the host;
determining, by the second socket, to process the second packet using the second VTOE;
transmitting the second packet to the second VTOE, wherein transmitting the second packet to the second VTOE bypasses a second VNS interposed between the second socket and second VTOE;
transmitting the second packet to the HW TOE, wherein the HW TOE is configured to process the second packet in accordance with TCP;
processing the second packet, using the HW TOE, to obtain a second processed packet; and
transmitting the second processed packet to a network operatively connected to the HW TOE.

3. The method of claim 1, further comprising:
receiving a second packet by a second socket on the host;
determining, by the second socket, to process the second packet using the second VTOE;
transmitting the second packet to the second VTOE, wherein transmitting the second packet to the second VTOE bypasses a second VNS interposed between the second socket and second VTOE;
determining, by the second VTOE, that the HW TOE is not available to process the second packet;
transmitting, in response to determining by the second VTOE that the HW TOE is not available, the second packet to an On-Load TOE executing on the host;
processing the second packet, using the On-load TOE, to obtain a second processed packet; and
transmitting the second processed packet to a network operatively connected to a network interface card (NIC) operatively connected to the host.

4. The method of claim 3, further comprising:
wherein prior to transmitting the second packet to an On-Load TOE executing on the host:
selecting the On-load TOE using a policy engine, wherein the policy engine comprises a policy that defines an action to take when the HW TOE is not available.

5. The method of claim 3, wherein the On-Load TOE comprises software executing on the host and wherein the On-Load TOE processes the second packet using first configuration parameters, wherein the HW TOE comprises second configuration parameters and wherein the first configuration parameters and the second configuration parameters are the same.

6. The method of claim 3, wherein the On-Load TOE processes the second packet using first configuration parameters obtained from the second VTOE.

7. The method of claim 1, wherein the host comprises an accounting engine configured to track the number of packets processed by the HW TOE.

8. The method of claim 1, wherein the first VTOE and second VTOE are located in a Media Access Control (MAC) layer of the host.

9. The method of claim 1, wherein the first VTOE and the second VTOE are each associated with a unique Internet Protocol (IP) address.

10. A system, comprising:
a host;
a hardware Transmission Control Protocol (TCP) offload engine (HW TOE) operatively connected to the host;
an On-Load TOE executing on the host;
a network interface card (NIC) operatively connected to the host,
wherein a first socket executing on the host is configured to:
receive a first packet,
determine to process the first packet using a first virtual TOE (VTOE), and
transmit the first packet to the first VTOE, wherein transmitting the first packet to the first VTOE bypasses a first virtual network stack (VNS) interposed between the first socket and first VTOE,
wherein the first VTOE is configured to:
transmit the first packet to the HW TOE operatively connected to the host, wherein the HW TOE is configured to process the first packet in accordance with TCP and wherein the HW TOE is associated with the first VTOE and a second VTOE in the host, and
wherein the HW TOE is configured to:
process the first packet to obtain a first processed packet, and
transmit the first processed packet to a network operatively connected to the HW TOE.

11. The system of claim 10,
wherein a second socket executing on the host is configured to:
receive a second packet;
determine to process the second packet using the second VTOE;
transmit the second packet to the second VTOE, wherein transmitting the second packet to the second VTOE bypasses a second VNS interposed between the second socket and second VTOE;
wherein the second VTOE is configured to:
determine that the HW TOE is not available to process the second packet,
transmit, in response to determination by the second VTOE that the HW TOE is not available, the second packet to an On-Load TOE executing on the host; and
wherein the On-load TOE is configured to:
process the second packet, using, to obtain a second processed packet; and
transmit the second processed packet to the network operatively connected to the NIC operatively connected to the host.

12. The system of claim 11,
Wherein, prior to transmitting the second packet to an On-Load TOE executing on the host, the second VTOE is configured to select the On-load TOE using a policy engine, wherein the policy engine comprises a policy that defines an action to take when the HW TOE is not available.

13. The system of claim 11, wherein the On-Load TOE comprises software executing on the host and wherein the On-Load TOE processes the second packet using first configuration parameters, wherein the HW TOE comprises second configuration parameters and wherein the first configuration parameters and the second configuration parameters are the same.

14. The system of claim 11, wherein the On-Load TOE processes the second packet using first configuration parameters obtained from the second VTOE.

15. The system of claim 10, wherein the host comprises an accounting engine configured to track the number of packets processed by the HW TOE.

16. The system of claim 10, wherein the first VTOE and second VTOE are located in a Media Access Control (MAC) layer of the host.

17. The system of claim 10, wherein the first VTOE and the second VTOE are each associated with a unique Internet Protocol (IP) address.

18. A non-transitory computer readable medium comprising a plurality of executable instructions for processing packets, wherein the plurality of executable instructions comprises instructions to:
receive a first packet by a first socket on a host;
determine, by the first socket, to process the first packet using a first virtual Transmission Control Protocol (TCP) offload engine (VTOE);
transmit the first packet to the first VTOE, wherein transmitting the first packet to the first VTOE bypasses a first virtual network stack (VNS) interposed between the first socket and first VTOE;
transmit the first packet to a hardware TOE (HW TOE) operatively connected to the host, wherein the HW TOE is configured to process the first packet in accordance with TCP and wherein the HW TOE is associated with the first VTOE and a second VTOE in the host;
process the first packet, using the HW TOE, to obtain a first processed packet; and
transmit the first processed packet to a network operatively connected to the HW TOE.

19. The computer readable medium of claim 18, wherein the plurality of executable instructions further comprises instructions to:
receive a second packet by a second socket on the host;
determine, by the second socket, to process the second packet using the second VTOE;
transmit the second packet to the second VTOE, wherein transmitting the second packet to the second VTOE bypasses a second VNS interposed between the second socket and second VTOE;
transmit the second packet to the HW TOE, wherein the HW TOE is configured to process the second packet in accordance with TCP;
process the second packet, using the HW TOE, to obtain a second processed packet; and
transmit the second processed packet to a network operatively connected to the HW TOE.

20. The computer readable medium of claim 18, wherein the plurality of executable instructions further comprises instructions to:
receive a second packet by a second socket on the host;
determine, by the second socket, to process the second packet using the second VTOE;
transmit the second packet to the second VTOE, wherein transmitting the second packet to the second VTOE bypasses a second VNS interposed between the second socket and second VTOE;
determine, by the second VTOE, that the HW TOE is not available to process the second packet;
transmit, in response to determining by the second VTOE that the HW TOE is not available, the second packet to an On-Load TOE executing on the host;
process the second packet, using the On-load TOE, to obtain a second processed packet; and
transmit the second processed packet to a network operatively connected to a network interface card (NIC) operatively connected to the host.

* * * * *

UNITED STATES PATENT AND TRADEMARK OFFICE
CERTIFICATE OF CORRECTION

PATENT NO. : 7,751,401 B2 Page 1 of 1
APPLICATION NO. : 12/164378
DATED : July 6, 2010
INVENTOR(S) : Darrin P. Johnson et al.

It is certified that error appears in the above-identified patent and that said Letters Patent is hereby corrected as shown below:

In the Claims:

In Claim 19, column 14, line 1, it reads "The computer readable medium of claim 18, wherein" and should read --The non-transitory computer readable medium of claim 18 wherein the plurality of,-- and In Claim 20, column 14, line 18, it reads "The computer readable medium of claim 18, wherein" and should read --The non-transitory computer readable medium of claim 18, wherein the plurality of--.

Signed and Sealed this

Second Day of November, 2010

David J. Kappos
*Director of the United States Patent and Trademark Office*